United States Patent
Ling et al.

(10) Patent No.: US 10,037,387 B2
(45) Date of Patent: Jul. 31, 2018

(54) METHOD AND APPARATUS FOR PROCESSING A WEBPAGE

(71) Applicant: TENCENT TECHNOLOGY (SHENZHEN) COMPANY LIMITED, Shenzhen (CN)

(72) Inventors: Yibin Ling, Shenzhen (CN); Xuefeng Li, Shenzhen (CN); Xi Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 355 days.

(21) Appl. No.: 14/740,191

(22) Filed: Jun. 15, 2015

(65) Prior Publication Data
US 2015/0278390 A1    Oct. 1, 2015

Related U.S. Application Data

(63) Continuation of application No. PCT/CN2013/086731, filed on Nov. 8, 2013.

(30) Foreign Application Priority Data

Dec. 13, 2012   (CN) .......................... 2012 1 0539489

(51) Int. Cl.
*G06F 17/00*    (2006.01)
*G06F 17/30*    (2006.01)

(52) U.S. Cl.
CPC .. *G06F 17/30905* (2013.01); *G06F 17/30896* (2013.01); *G06F 17/30899* (2013.01)

(58) Field of Classification Search
CPC .................. G06F 17/30896; G06F 17/2247
See application file for complete search history.

(56) References Cited

U.S. PATENT DOCUMENTS 6,684,088 B1 * 1/2004 Halahmi .............. G06Q 10/107
                                                   455/412.1
7,464,328 B2    12/2008 Hall et al.
(Continued)

FOREIGN PATENT DOCUMENTS

| CN | 1732461 A | 2/2006 |
|----|-----------|--------|
| CN | 1799051 A | 7/2006 |

(Continued)

OTHER PUBLICATIONS

Schilit, et al., "m-Links: An Infrastructure for Very Small Internet Devices" ACM SIGMOBILE copyright 2001 ACM, p. 122-131.*
(Continued)

*Primary Examiner* — Amelia Tapp
(74) *Attorney, Agent, or Firm* — Cantor Colburn LLP

(57) ABSTRACT

According to an example of the present disclosure, a mobile terminal recognizes a webpage in an archive format in a browser of the mobile terminal, parses the webpage in the archive format to obtain file header information, obtains boundary strings and a character encoding format according to the file header information, performs a content dividing and content decoding operation to the webpage in the archive format, and displays data obtained via the content dividing and content decoding operation in form of a webpage.

6 Claims, 4 Drawing Sheets

(56) References Cited

U.S. PATENT DOCUMENTS

| | | | |
|---|---|---|---|
| 8,243,981 B2* | 8/2012 | Zandifar | G06T 1/0028 382/100 |
| 2003/0009694 A1* | 1/2003 | Wenocur | G06Q 10/107 726/4 |
| 2004/0088546 A1 | 5/2004 | Shah et al. | |
| 2006/0106837 A1 | 5/2006 | Choi | |
| 2007/0011130 A1 | 1/2007 | Yamabuchi | |
| 2009/0172520 A1 | 7/2009 | Kim | |
| 2011/0185024 A1* | 7/2011 | Ramarao | H04L 51/08 709/206 |

FOREIGN PATENT DOCUMENTS

| | | |
|---|---|---|
| CN | 101484892 A | 7/2009 |
| CN | 102033944 A | 4/2011 |
| CN | 102065571 A | 5/2011 |
| CN | 102325188 A | 1/2012 |

OTHER PUBLICATIONS

"Sample MIME Message" topic last modified: Jun. 8, 2004, p. 1-2, retrieved from https://msdn.microsoft.com/en-us/library/ms526560.*

International Search Report dated Feb. 13, 2014 re: Application No. PCT/CN2013/086731; citing: CN 102065571 A, CN 102033944 A and CN 102325188 A.

CN Office Action dated Apr. 19, 2017 re: Application No. 201210539489.0; pp. 1-7; citing: CN102065571A, CN1799051A, CN1732461A, CN101484892A, US7464328B2 and US2004088546A.

International Preliminary Report on Patentability dated Jun. 25, 2015 re: Application No. PCT/CN2013/086731; pp. 1-5; citing: CN 102065571 A.

* cited by examiner

METHOD AND APPARATUS FOR PROCESSING A WEBPAGE

CROSS-REFERENCE TO RELATED APPLICATIONS

This application is a continuation of International Application No. PCT/CN2013/086731, filed on Nov. 8, 2013. This application claims the benefit and priority of Chinese Patent Application No. 201210539489.0, filed Dec. 13, 2012. The entire disclosures of each of the above applications are incorporated herein by reference.

FIELD

The present disclosure relates to Internet and mobile communications techniques, and more particularly, to a method and an apparatus for processing a webpage.

BACKGROUND

MHT/MHTML, short for Multipurpose Internet Mail Extensions Hyper Text Markup Language (MIME HTML), is a web page archive format used to combine resources that are typically represented by external links (such as images, Flash animations, Java applets, audio files) with HTML code into a single file. The content of an MHTML file is encoded as if it were an HTML e-mail message, using the MIME type multipart/related. The first part of the file is normally encoded HTML; subsequent parts are additional resources identified by their original URLs and encoded in base64.

SUMMARY

According to an example of the present disclosure, a method for processing a webpage is provided. The method includes:
  recognizing, by a mobile terminal, a webpage in an archive format in a browser of the mobile terminal;
  parsing, by the mobile terminal, the webpage in the archive format to obtain file header information;
  obtaining, by the mobile terminal, boundary strings and a character encoding format according to the file header information, and performing a content dividing and content decoding operation to the webpage in the archive format; and
  displaying, by the mobile terminal, data obtained via the content dividing and content decoding operation in form of a webpage.

According to another example of the present disclosure, a method for processing a webpage is provided. The method includes:
  retrieving, by a mobile terminal, webpage Hyper Text Markup Language (HTML) source code from a browser of the mobile terminal, and obtaining webpage information of the webpage;
  parsing, by the mobile terminal, the webpage information of the webpage to obtain file header information and resource file data;
  respectively performing, by the mobile terminal, a quoted-printable encoding to the webpage HTML source code, and cascading style sheet (css) and/or java script (js) data in the resource file data, performing a base64 encoding to a picture in the resource file data;
  combining, by the mobile terminal, the file header information, the encoded webpage HTML source code and the encoded resource file data into combined data in turn; and
  isolating, by the mobile terminal, the file header information, the encoded webpage HTML source code and the encode resource file data by boundary strings and ending the combined data with a boundary string to form a single webpage file for storage.

According to another example of the present disclosure, an apparatus for processing a webpage is provided. The apparatus includes:
  one or more processors;
  memory; and
  one or more program modules stored in the memory and to be executed by the one or more processors, the one or more program modules comprise:
  a recognizing module, adapted to recognize a webpage in an archive format in a browser of the mobile terminal;
  a parsing module, adapted to parse the webpage in the archive format to obtain file header information;
  a block decoding module, adapted to obtain boundary strings and a character encoding format according to the file header information, and perform a content dividing and content decoding operation to the webpage in the archive format; and
  a displaying module, adapted to display the data obtained via the content dividing and content decoding operation in form of a webpage.

Other aspects or embodiments of the present disclosure can be understood by those skilled in the art in light of the description, the claims, and the drawings of the present disclosure.

BRIEF DESCRIPTION OF THE DRAWINGS

Features of the present disclosure are illustrated by way of example and not limited in the following figures, in which like numerals indicate like elements, in which.

DETAILED DESCRIPTION

The preset disclosure will be described in further detail hereinafter with reference to accompanying drawings and examples to make the technical solution and merits therein clearer.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Figure 1:
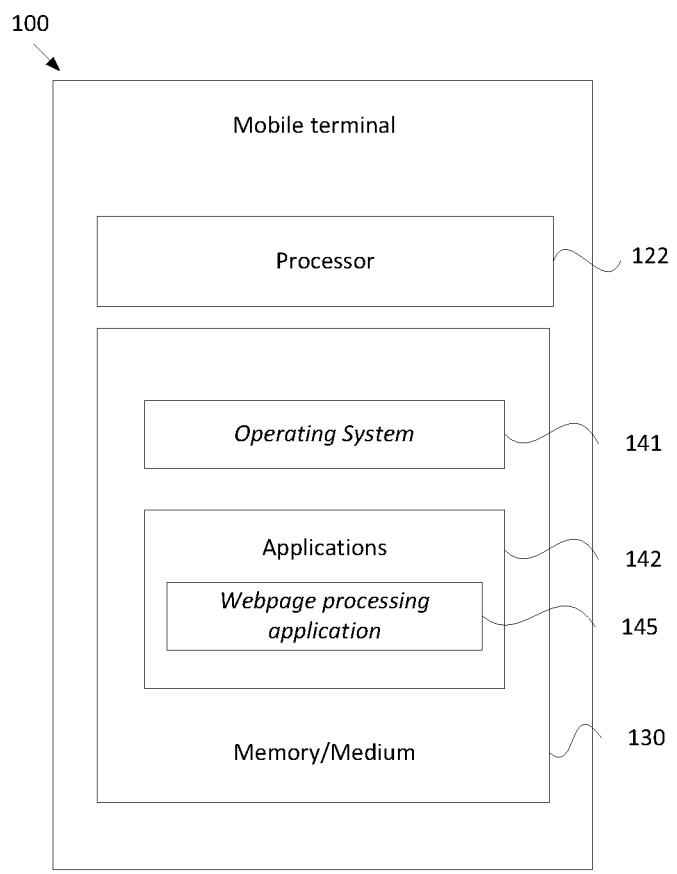
FIG. 1 is a schematic diagram illustrating an example of a mobile terminal for executing the method of the present disclosure.

FIG. 1 is a schematic diagram illustrating an example of a mobile terminal which may execute the method of the present disclosure. As shown in FIG. 1, a mobile terminal 100 may be a computing device capable of executing a method and apparatus of present disclosure. The mobile terminal 100 may, for example, be a device such as a smart phone.

The mobile terminal 100 may also include or may execute a variety of operating systems 141, and a variety of possible applications 142, such as a webpage processing application 145 executable by a processor to implement the methods provided by the present disclosure.

Further, the mobile terminal 100 may include one or more non-transitory processor-readable storage media 130 and one or more processors 122 in communication with the non-transitory processor-readable storage media 130. For example, the non-transitory processor-readable storage media 130 may be any form of non-transitory storage medium known in the art. The one or more non-transitory processor-readable storage media 130 may store sets of instructions, or units and/or modules that comprise the sets of instructions, for conducting operations described in the present application. The one or more processors may be configured to execute the sets of instructions and perform the operations in example embodiments of the present application.

Figure 2:
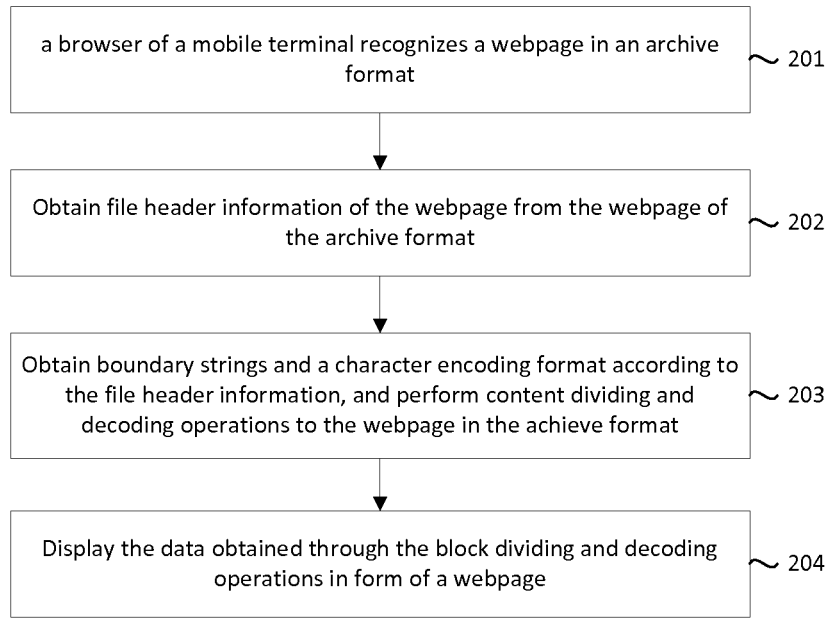
FIG. 2 is a flowchart illustrating a method for processing a webpage according to an example of the present disclosure.

FIG. 2 is a schematic diagram illustrating a method for processing a webpage according to an example of the present disclosure. FIG. 2 is a simplified diagram according to one embodiment of the present invention. This diagram is merely an example, which should not unduly limit the scope of the claims. One of ordinary skill in the art would recognize many variations, alternatives, and modifications.

As shown in FIG. 2, the method includes the following processes.

At block 201, a browser of a mobile terminal recognizes a webpage in an archive format.

In this example, the webpage in the archive format includes a webpage in the MHT format, an email file, etc. Hereinafter, the webpage in the MHT format is taken as an example.

When desiring to browse a webpage in the MHT format in the mobile terminal, a user inputs an address of the MHT webpage to be opened in the browser of the mobile terminal. Thus, the browser of the mobile terminal recognizes the MHT webpage according to the address of the MHT webpage. The address may be a network address or a local address. Accordingly, the browser may retrieve the MHT webpage from the Internet or from a local storage of the mobile terminal.

At block 202, file header information of the webpage is obtained from the webpage of the archive format.

After the webpage is recognized, the webpage is parsed to obtain the file header information which includes boundary strings used for dividing webpage contents.

At block 203, boundary strings and a character encoding format are obtained according to the file header information, and content dividing and decoding operations are performed to the webpage in the achieve format.

The boundary strings divide the webpage contents into blocks, e.g., file header information, webpage HTML source code, source file data, etc.

The source file data includes pictures, cascading style sheet (css) and/or java script (js) data, etc.

Each block divided from the webpage contents includes header information. According to the header information of each block, a character encoding format (e.g., UTF-8/GBK) of the block may be obtained. Thus, the HTML source code, pictures, css and/or js data of the webpage can be decoded according to the character encoding format of each block.

During the decoding, a base64 decoding is performed to the pictures in the blocks and the decoded pictures are put in a cache of the browser of the mobile terminal A quoted-printable decoding is performed to the webpage HTML source code, css and/or js data in the blocks, and the css and/or js data are put into the cache of the browser of the mobile terminal At block 204, the data obtained through the block dividing and decoding operations are displayed in form of a webpage.

The webpage HTML source code is opened in form of a webpage. The HTML webpage reads the cache of the browser according to corresponding addresses to obtain pictures, css and/or js data from the cache of the browser and displays the obtained data in the webpage, so as to display the MHT webpage completely.

In this example, it is realized to open an MHT file or a file in a similar format by the browser of the mobile terminal It should be noted that, for a traditional webpage, there may be a character encoding format which is different from the above described base64, quoted-printable coding. The former is to encode characters except for ASCII codes in the original webpage. The latter is to encrypt all characters. Herein, the encryption is not encryption in deed, since any one may perform a decryption.

As to the former, a charset character encoding identifier is added in the MHT header in examples of the present disclosure. It is required to determine the type of the character encoding during the decoding procedure before decoding other parts of the MHT file (different character encoding have different decoding algorithms).

As to the latter, what is decoded by base64 is usually picture which may be put into the cache. During the decoding of the quoted-printable encoding, an algorithm needs to be used to process each byte and complete the decoding via a specific combination of bytes. Finally, the obtained byte data are converted into a readable string.

Figure 3:
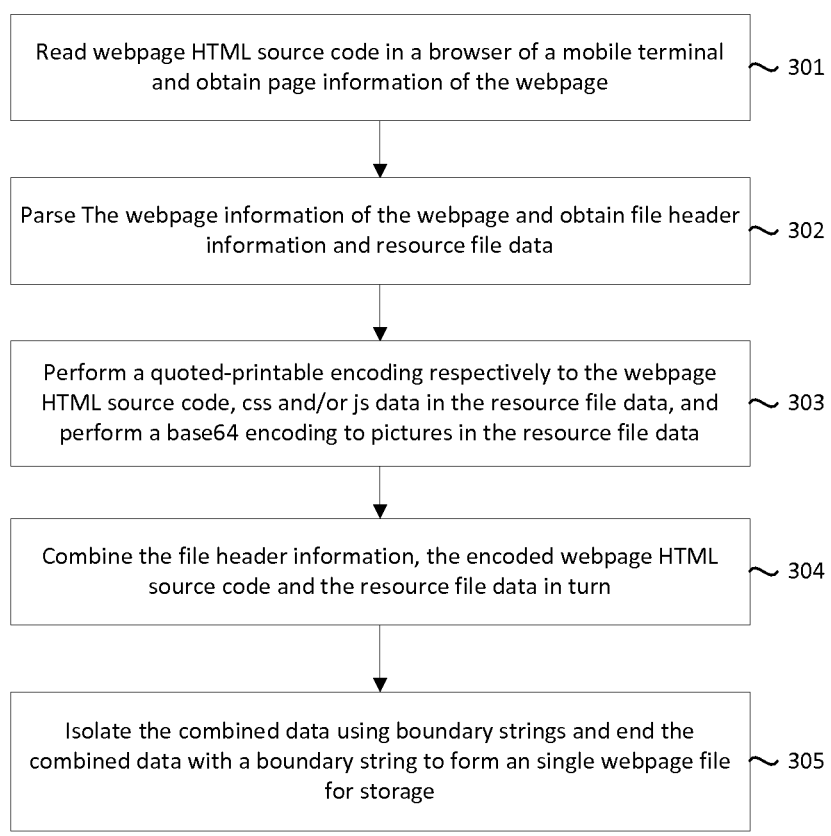
FIG. 3 is a flowchart illustrating a method for processing a webpage according to an example of the present disclosure.

FIG. 3 is a flowchart illustrating a method for processing a webpage according to an example of the present disclosure. As shown in FIG. 3, the method includes the following processes.

At block 301, webpage HTML source code is read in a browser of a mobile terminal and page information of the webpage is obtained.

At block 302, the webpage information of the webpage is parsed and file header information and resource file data are obtained.

At block 303, a quoted-printable encoding is performed respectively to the webpage HTML source code, css and/or js data in the resource file data, and a base64 encoding is performed to a picture in the resource file data.

At block 304, the file header information, the encoded webpage HTML source code and the encoded resource file data are combined into combined data in turn.

At block 305, the file header information, the encoded webpage HTML source code and the resource file data are isolated from each other using boundary strings and the combined data is ended with a boundary string to form a single webpage file for storage.

In this example, it is realized to save a webpage of a website as an archive file using the browser in the mobile terminal. For a webpage whose contents are hard to be retrieved, the webpage can be saved in the webpage archive format. Thus, the user is capable of opening it in the mobile terminal or copying it to a personal computer to open it.

In one example, suppose that the mobile terminal is a mobile phone and the webpage is in the MHT format. At first, HTML source code of the MHT webpage is read. At same time, webpage information of the MHT webpage is also read.

The webpage information of the webpage is parsed. Information such as webpage title/character encoding is obtained to generate MHT header information. At the same time, resource file data such as picture, css and/or js data are obtained.

Then, a quoted-printable encoding is respectively performed to the HTML source code, the css and/or js data in the resource file data. And a base64 encoding is performed to the picture in the resource file data.

The quoted-printable encoding is an encoding method which denotes each character under a variety of encoding formats using printable ASCII characters. Base64 encoding is an encoding method which expresses binary data using 64 characters including 26 uppercase letters, 26 lowercase letters, 10 figures, "+" and "=".

The file header information, the encoded webpage HTML source data and the encoded resource file data are combined in turn. The file header information, the encoded webpage HTML source data and the encoded resource file data in the combined data are isolated using boundary strings and the combined data is ended with a boundary string to form a single webpage file for storage.

Through the above example, it is realized to save an MHT file or a file in a similar format by the browser of the mobile terminal. For the browser of the mobile terminal, contents of many webpages are hard to be retrieved and optimized according to the situation of the mobile terminal. In this case, it is possible to save the webpage as an MHT file. It can be opened locally when required. Or, the MHT file saved in the mobile terminal may also be copied to the PC or other terminals and then opened using the method provided by the example of the present disclosure or by other methods, which is not restricted in the present disclosure.

The solution of the present disclosure may also be used to save files in other similar formats. For example, the format of mail header is similar to that of the MHT file. Therefore, the above solution provided by the example of the present disclosure may also be applied to support the parsing of the mail header.

Figure 4:
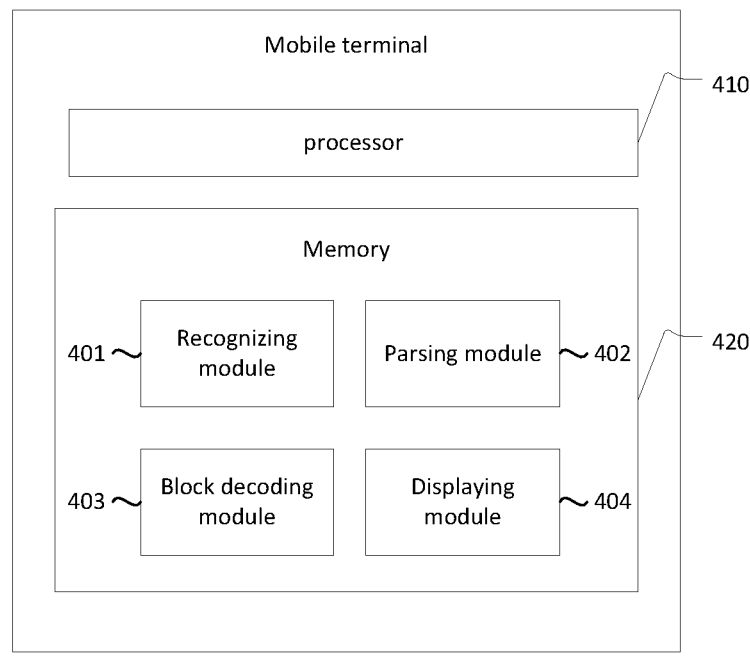
FIG. 4 is a schematic diagram illustrating a mobile terminal for processing a webpage according to an example of the present disclosure.

FIG. 4 is a schematic diagram illustrating a structure of a mobile terminal according to an example of the present disclosure. As shown in FIG. 4, the mobile terminal includes: one or more processors 410 and a memory 420. The memory 420 includes one or more program modules executed by the one or more processors 410, the one or more program modules include: a recognizing module 401, a parsing module 402, a block decoding module 403 and a displaying module 404.

The recognizing module 401 is adapted to recognize a webpage in an archive format in a browser of the mobile terminal.

The parsing module 402 is adapted to parse the webpage in the archive format to obtain file header information.

The block decoding module 403 is adapted to obtain boundary strings and a character encoding format according to the file header information and perform a blocking and decoding operation to the contents of the webpage in the archive format.

The displaying module 404 is adapted to display the data obtained by the blocking and decoding operation.

The webpage in the archive format includes but is not limited to an MHT webpage. The webpage may also in a mail format. Hereinafter, the MHT format is taken as an example.

In particular, suppose that the mobile terminal is a mobile phone and the webpage is in the MHT format. When the MHT webpage is opened in a browser of the mobile phone, an address of the MHT webpage to be opened is inputted in the browser of the mobile phone. The recognizing module 401 recognizes the MHT webpage from the Internet or a local storage according to the address of the MHT webpage.

After the recognizing module 401 recognizes the MHT webpage, the parsing module 402 parses the webpage to obtain MHT file header information which includes information such as boundary strings used for isolating webpage contents.

The block decoding module 403 divides the webpage contents into blocks according to the boundary strings, wherein the divided blocks include file header information, webpage HTML source code, resource file data, etc.

The resource file data includes picture, css and/or js data.

Each block divided from the webpage contents includes header information. According to the header information of each block, a character encoding format (e.g., UTF-8/GBK) of the block may be obtained. Thus, the HTML source code, pictures, css and/or js data of the webpage can be decoded according to the character encoding format of each block.

During the decoding, a base64 decoding is performed to the pictures in the blocks and the decoded pictures are put in a cache of the browser of the mobile terminal A quoted-printable decoding is performed to the webpage HTML source code, css and/or js data in the blocks, and the css and/or js data are put into the cache of the browser of the mobile terminal The displaying module 404 opens the webpage HTML source code in form of a webpage. The HTML webpage reads the cache of the browser according to corresponding addresses to obtain pictures, css and/or js data from the cache of the browser and displays the obtained data in the webpage, so as to display the MHT webpage completely.

Figure 5:
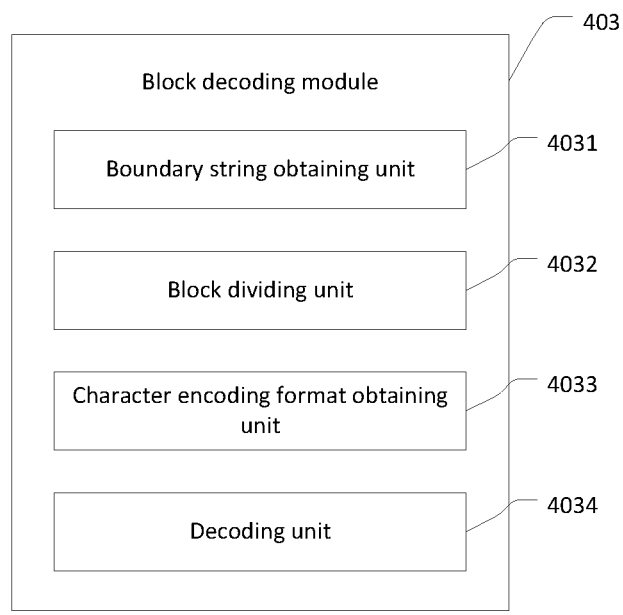
FIG. 5 is a schematic diagram illustrating a block decoding module in the mobile terminal according to an example of the present disclosure.

FIG. 5 is a schematic diagram illustrating a structure of the block decoding module 403. As shown in FIG. 5, the block decoding module 403 may include: a boundary string obtaining unit 4031, a block dividing unit 4032, a character encoding format obtaining unit 4033 and a decoding unit 4034.

The boundary string obtaining unit 4031 is adapted to obtain boundary strings from the file header information.

The block dividing unit 4032 is adapted to divide the webpage in the archive format into file header information, webpage HTML source code, resource file data according to the boundary strings, wherein each block include header information.

The character encoding format obtaining unit 4033 is adapted to obtain a character encoding format of each block according to the header information of the block.

The decoding unit 4034 is adapted to decode each block according to the character encoding format of the block.

In this example, it is realized to open an MHT file or a file in a similar format by the browser of the mobile terminal It should be noted that, for a traditional webpage, there may be a character encoding format which is different from the above described base64, quoted-printable coding. The former is to encode characters except for ASCII codes in the original webpage. The latter is to encrypt all characters. Herein, the encryption is not encryption in deed, since any one may perform a decryption.

As to the former, a charset character encoding identifier is added in the MHT header in examples of the present disclosure. It is required to determine the type of the character encoding during the decoding procedure before decoding other parts of the MHT file (different character encoding have different decoding algorithms).

As to the latter, what is decoded by base64 is usually picture which may be put into the cache. During the decoding of the quoted-printable encoding, an algorithm needs to be used to process each byte and complete the decoding via a specific combination of bytes. Finally, the obtained byte data are converted into a readable string.

Figure 6:
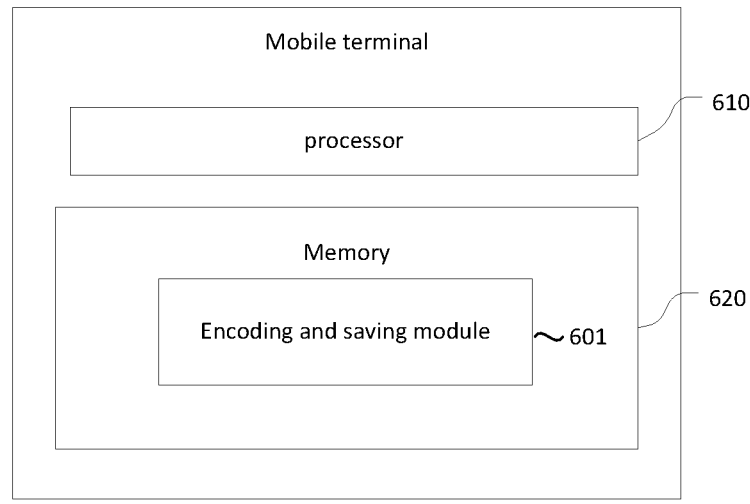
FIG. 6 is a schematic diagram another structure of a mobile terminal according to an example of the present disclosure.

FIG. 6 is a schematic diagram illustrating a structure of a mobile terminal according to another example of the present disclosure. As shown in FIG. 6, the mobile terminal includes one or more processors 610 and a memory 620. The memory 620 includes one or more program modules executed by the one or more processors 610, the one or more program modules include: an encoding and saving module 601.

Figure 7:
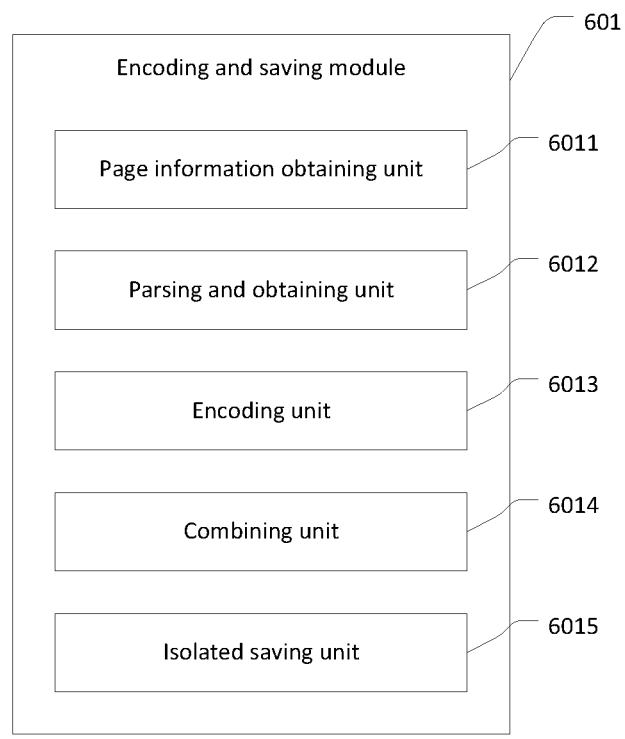
FIG. 7 is a schematic diagram illustrating a structure of an encoding and saving module according to an example of the present disclosure.

As shown in FIG. 7, the encoding and saving module 601 includes: a page information obtaining unit 6011, a parsing and obtaining unit 6012, an encoding unit 6013, a combining unit 6014 and an isolated saving unit 6015.

The page information obtaining unit 6011 is adapted to read webpage HTML source code from a browser of the mobile terminal and obtain webpage information of the webpage.

The parsing and obtaining unit 6012 is adapted to parse the webpage information of the webpage to obtain file header information and resource file data.

The encoding unit 6013 is adapted to respectively perform a quoted-printable encoding to the webpage HTML source code, and css and/js data in the resource file data, and perform a base64 encoding to pictures in the resource file data.

The combining unit 6014 is adapted to combine the file header information, the encoded webpage HTML source code and encoded resource file data in turn.

The isolated saving unit 6015 is adapted to isolate the data in the combination by boundary strings and end the combined data with a boundary string to form a single webpage file for storage.

In this example, it is realized to save a webpage of a website as an archive file using the browser in the mobile terminal. For a webpage whose contents are hard to be retrieved, the webpage can be saved in the webpage archive format. Thus, the user is capable of opening it in the mobile terminal or copying it to a personal computer to open it.

In one example, suppose that the mobile terminal is a mobile phone and the webpage is in the MHT format. At first, HTML source code of the MHT webpage is read. At same time, webpage information of the MHT webpage is also read.

The webpage information of the webpage is parsed. Information such as webpage title/character encoding is obtained to generate MHT header information. At the same time, resource file data such as picture, css and/or js data are obtained. Then, a quoted-printable encoding is respectively performed to the HTML source code, the css and/or js data in the resource file data. And a base64 encoding is performed to the picture in the resource file data.

The quoted-printable encoding is an encoding method which denotes each character under a variety of encoding formats using printable ASCII characters. Base64 encoding is an encoding method which expresses binary data using 64 characters including 26 uppercase letters, 26 lowercase letters, 10 figures, "+" and "=".

The file header, encoded webpage HTML source data and the resource file data are combined into combined data in turn. The file header information, the encoded webpage HTML source data and the encoded resource file data in the combined data are isolated using boundary strings and the combined data is ended with a boundary string to form a single webpage file for storage.

Through the above example, it is realized to save an MHT file or a file in a similar format by the browser of the mobile terminal. For the browser of the mobile terminal, contents of many webpages are hard to be retrieved and optimized according to the situation of the mobile terminal. In this case, it is possible to save the webpage as an MHT file. It can be opened locally when required. Or, the MHT file saved in the mobile terminal may also be copied to the PC or other terminals and then opened using the method provided by the example of the present disclosure or by other methods, which is not restricted in the present disclosure.

The solution of the present disclosure may also be used to save files in other similar formats. For example, the format of mail header is similar to that of the MHT file. Therefore, the above solution provided by the example of the present disclosure may also be applied to support the parsing of the mail header.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for processing a webpage, comprising:
recognizing, by a mobile terminal, a webpage in an archive format in a browser of the mobile terminal;
parsing, by the mobile terminal, the webpage in the archive format to obtain file header information;
obtaining, by the mobile terminal, boundary strings and a character encoding format according to the file header information, and performing a content dividing and content decoding operation to the webpage in the archive format; and
displaying, by the mobile terminal, data obtained via the content dividing and content decoding operation in form of a webpage;
wherein the obtaining boundary strings and the character encoding format according to the file header information, and performing the content dividing and content decoding operation to the webpage in the archive format comprises:
obtaining, by the mobile terminal, the boundary strings from the file header information;
dividing, by the mobile terminal, the webpage in the archive format into blocks comprising the file header information, webpage Hyper Text Markup Language (HTML) source code and resource file data according to the boundary strings, wherein each block has header information;

obtaining, by the mobile terminal, the character encoding format of each block according to the header information of the block; and decoding, by the mobile terminal, each block according to the character encoding format of the block, wherein the resource file data comprises a picture, cascading style sheet (css) and/or java script (j s) data; the decoding each block according to the character encoding format of the block comprises:

performing, by the mobile terminal, a base64 decoding to the picture in the block, putting the decoded picture in a cache of the browser of the mobile terminal;

performing, by the mobile terminal, a quoted-printable decoding to the webpage HTML source code, css and/or js data in the block and putting the decoded css and/or js data into the cache of the browser of the mobile terminal.

2. The method of claim 1, wherein the displaying the data obtained via the content dividing and content decoding operation in form of the webpage comprises:

opening, by the mobile terminal, the webpage HTML source code as a webpage;

retrieving, by the mobile terminal, the picture, css and/or js data in the cache of the browser of the mobile terminal according to citing addresses in the webpage HTML source code and displaying the picture, css and/or js data in the webpage.

3. A method for processing a webpage, comprising:

retrieving, by a mobile terminal, webpage Hyper Text Markup Language (HTML) source code from a browser of the mobile terminal, and obtaining webpage information of the webpage;

parsing, by the mobile terminal, the webpage information of the webpage to obtain file header information and resource file data;

respectively performing, by the mobile terminal, a quoted-printable encoding to the webpage HTML source code, and cascading style sheet (css) and/or java script (js) data in the resource file data, performing a base64 encoding to a picture in the resource file data;

combining, by the mobile terminal, the file header information, the encoded webpage HTML source code and the encoded resource file data into combined data in turn; and isolating, by the mobile terminal, the file header information, the encoded webpage HTML source code and the encode resource file data by boundary strings and ending the combined data with a boundary string to form a single webpage file for storage.

4. The method of claim 3, wherein the webpage information comprises at least a title of the webpage or a character format.

5. A mobile terminal for processing a webpage, comprising:

one or more processors;
memory; and
one or more program modules stored in the memory and to be executed by the one or more processors, the one or more program modules comprise:

a recognizing module, adapted to recognize a webpage in an archive format in a browser of the mobile terminal;

a parsing module, adapted to parse the webpage in the archive format to obtain file header information;

a block decoding module, adapted to obtain boundary strings and a character encoding format according to the file header information, and perform a content dividing and content decoding operation to the webpage in the archive format; and a displaying module, adapted to display the data obtained via the content dividing and content decoding operation in form of a webpage;

wherein the block decoding module comprises:

a boundary string obtaining unit, adapted to obtain boundary strings from the file header information;

a block dividing unit, adapted to divide the webpage in the archive format into blocks comprising the file header information, the webpage HTML source code and the resource file data according to the boundary strings, wherein each block has header information;

a character encoding format obtaining unit, adapted to obtain a character encoding format of each block according to the header information of each block; and a decoding unit, adapted to decode each block according to the character encoding format of the block, wherein the resource file data comprises a picture, cascading style sheet (css) and/or java script (j s) data; the decoding unit is further adapted to perform a base64 decoding to the picture in the block, put the decoded picture in a cache of the browser of the mobile terminal; and perform a quoted-printable decoding to the webpage HTML source code, css and/or js data in the block and put the decoded css and/or js data into the cache of the browser of the mobile terminal.

6. The mobile terminal of claim 5, wherein the displaying module is further adapted to:

open the webpage HTML source code as a webpage;
retrieve the picture, the css and/or js data in the cache of the browser of the mobile terminal according to citing addresses in the webpage HTML source code; and
display the picture, the css and/or js data in the webpage.

* * * * *